US011254302B2

(12) United States Patent
Huang et al.

(10) Patent No.: US 11,254,302 B2
(45) Date of Patent: Feb. 22, 2022

(54) STABILIZED REAL TIME TRAJECTORY OPTIMIZATION FOR HYBRID ENERGY MANAGEMENT UTILIZING CONNECTED INFORMATION TECHNOLOGIES

(71) Applicants: TOYOTA MOTOR ENGINEERING & MANUFACTURING NORTH AMERICA, INC., Plano, TX (US); THE REGENTS OF THE UNIVERSITY OF MICHIGAN, Ann Arbor, MI (US)

(72) Inventors: Mike X. Huang, Ann Arbor, MI (US); Di Chen, Ann Arbor, MI (US)

(73) Assignees: TOYOTA MOTOR ENGINEERING & MANUFACTURING NORTH AMERICA, INC., Plano, TX (US); THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 80 days.

(21) Appl. No.: 16/883,253

(22) Filed: May 26, 2020

(65) Prior Publication Data
US 2021/0370907 A1 Dec. 2, 2021

(51) Int. Cl.
*B60W 20/12* (2016.01)
*G01C 21/34* (2006.01)
(Continued)

(52) U.S. Cl.
CPC .............. *B60W 20/12* (2016.01); *B60L 58/12* (2019.02); *B60W 20/15* (2016.01); *B60W 20/40* (2013.01); *G01C 21/3469* (2013.01)

(58) Field of Classification Search
CPC ...... B60W 20/12; B60W 20/15; B60W 20/40; B60L 58/12; G01C 21/3469
See application file for complete search history.

(56) References Cited

U.S. PATENT DOCUMENTS 7,360,615 B2   4/2008   Salman et al.
9,849,872 B2  12/2017   Jehle et al.
(Continued)

OTHER PUBLICATIONS

Mazen Alamir, et al., "On solving optimal control problems for switched hybrid nonlinear systems by strong variations algorithms", Control & Computation, Corpus ID: 9136360, 2003, pp. 1-28.

*Primary Examiner* — Ramsey Refai
(74) *Attorney, Agent, or Firm* — Oblon, McClelland, Maier & Neustadt, L.L.P.

(57) ABSTRACT

A vehicle control method in a hybrid electric vehicle including an internal combustion engine, a battery, an electric motor, and a control unit. The method includes estimating an estimated vehicle velocity trajectory, estimating an initial engine power trajectory, simulating state of charge of the battery with the vehicle velocity trajectory and the initial engine power trajectory, estimating an initial terminal co-state value, simulating backward co-state dynamics using the state of charge and vehicle velocity trajectory, to obtain a resulting co-state trajectory. The co-state trajectory is used to solve a minimization control and propagate state of charge dynamics forward in time. The method includes updating control and the co-state trajectory, adjusting the terminal co-state value, and controlling a usage of the battery and the internal combustion engine. The method can be performed to optimize the engine power trajectory to minimize fuel consumption in real time.

20 Claims, 10 Drawing Sheets

(51) Int. Cl.
    *B60W 20/40*     (2016.01)
    *B60W 20/15*     (2016.01)
    *B60L 58/12*     (2019.01)

(56) References Cited

U.S. PATENT DOCUMENTS

| | | |
|---|---|---|
| 10,112,595 B2 | 10/2018 | Naserian et al. |
| 2011/0066308 A1* | 3/2011 | Yang ............. B60W 10/06 701/22 |
| 2011/0071932 A1* | 3/2011 | Agassi ............. B60L 53/65 705/34 |
| 2011/0166774 A1* | 7/2011 | Schunder ........ G01C 21/3469 701/533 |
| 2014/0188304 A1* | 7/2014 | Richter ............. B60L 3/00 701/1 |
| 2015/0039350 A1* | 2/2015 | Martin ............. G08G 1/09626 705/4 |
| 2017/0080919 A1 | 3/2017 | Follen et al. |
| 2017/0129361 A1* | 5/2017 | Scaringe ............. B60L 3/12 |
| 2017/0320481 A1* | 11/2017 | Johannesson Mardh ............. B60W 50/0098 |
| 2018/0099658 A1 | 4/2018 | Ossareh et al. |
| 2018/0208176 A1 | 7/2018 | Kim |
| 2018/0370523 A1 | 12/2018 | Geller et al. |
| 2019/0232942 A1 | 8/2019 | Liu et al. |
| 2019/0389451 A1 | 12/2019 | Huang et al. |

\* cited by examiner

STABILIZED REAL TIME TRAJECTORY OPTIMIZATION FOR HYBRID ENERGY MANAGEMENT UTILIZING CONNECTED INFORMATION TECHNOLOGIES

BACKGROUND

Technical Field

The present disclosure is directed to a technique for determining an optimal fuel usage and battery usage in a hybrid electric vehicle for reaching a destination.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Hybrid electric vehicles (HEVs) have become increasingly popular among consumers concerned with their environmental impact and with increasing fuel economy. HEVs generally utilize an engine, e.g., an internal combustion engine (ICE), along with an electric motor, which can also operate as a generator to provide energy to a battery that powers the electric motor. HEVs can use an engine clutch that connects/disconnects the engine to/from a drivetrain. The drivetrain can include a transmission coupled to the electric motor for transmitting power from the engine, electric motor, or both. A HEV powertrain may include the engine, electric motor, and drivetrain.

HEVs may utilize various methods to minimize fuel consumption and battery energy usage over the course of a trip to maximize energy utilization. Such methods may take into account driving conditions (e.g., speed, acceleration, etc.) to decide on an optimal ratio of engine usage to battery usage of an HEV powertrain, sometimes referred to as a "power split."

A methodology has been developed to optimize power split for a hybrid electric vehicle given current conditions and a forecast of future conditions obtained from connected technologies: vehicle-to-vehicle (V2V), vehicle-to-infrastructure (V2I), and vehicle-to-everything (V2X) communications. The methodology utilizes single shooting on mixed-integer optimal control. For a considered trip with given (or predicted) velocity and thus torque demand profiles, the minimum fuel consumption problem is first formulated in continuous-time. Afterword, the resulting continuous-time two-point boundary value problem is discretized, and single shooting is used to obtain the solution of the two-point boundary value problem (TPBVP) numerically. It has been determined that this methodology has an issue which would manifest as busy engine-on-off behavior, i.e., commanding to turn the engine on and off at high frequency, e.g., 1 Hz. Additional hysteresis heuristics have been tried to mitigate the issue. However, even with the heuristics, the methodology remains difficult to tune and implement.

A two-point boundary value problem is one in which n1 conditions are given at the initial point x1, yn(x1) and that n2 are given at the final point x2, y1(x2). A "shooting method" of solving a two-point boundary value problem gets its name based on resemblance to the problem of hitting a target by adjusting the aim of an artillery piece. The method includes guessing (e.g., randomly) values for the functions y, at the initial point (those "free" $n_2$ values that are unknown from initial conditions). The method then integrates the initial value problem to arrive at the other boundary (the target). In general the solution values of y, at the final point will deviate from the required known $n_2$ boundary values there. The "score" in this shooting method is determined by the differences between target boundary values and those obtained by integrating. Next, the method adjusts the free initial point parameters to reduce the deviations at the final point. Iterations of this method are continued until the desired accuracy is achieved. Typically, the shooting method involves multiple shooting, in which a problem is divided into multiple stages, meaning solving the problem as multiple short problems. Alternatively, the shooting method may be accomplished as a single shot. In the case of single shot, there is a single initial condition and single terminal condition.

It is believed that the busy-on-off, or chattering, behavior can only be addressed by introducing an additional engine cranking state. However, in a conventional continuous-time formulation, i.e., the co-state corresponding to the cranking state becomes unstable even though the engine cranking has stable dynamics. Furthermore, as the interest in controlling a plug-in hybrid vehicle extends to co-optimizating its velocity and powertrain operation, when including vehicle dynamics to achieve fuel-efficient control of the plug-in hybrid vehicle by co-optimizing its velocity and powertrain operation with continuous-time formulation, unstable dynamics of the vehicle position (double-integrator) will also induce unstable co-state dynamics. As a result, the shooting iterations are difficult to be stabilized in practice.

In particular, it is not practical to adopt a direct and simultaneous approach. First of all, the fuel rate and efficiencies of motor and generator are static maps that are hard to be approximated accurately and efficiently by analytical expressions. As a result, the evaluation and approximation of the Hessian matrix required by multiple shooting would introduce significant numerical errors and be very computationally intensive. Also, many local minima exist, even for short-horizon problems. Second, with multiple shooting, the system dynamics are converted to equality constraints. Therefore in between multiple shooting iterations, the control sequence could be inconsistent with the state sequence (violating primal feasibility). Numerical errors with a Newton-type method would make the system's dynamic equations very hard to be satisfied with acceptable accuracy. Finally, as the first step towards real-time online implementation with a limited problem horizon, it would be crucial to obtain the solution for the entire problem offline. As single percent fuel economy differences are significant at scale, it is valuable to understand the optimality gap of the "short-horizon" receding horizon control versus the full trajectory optimization. A reasonable problem horizon for plug-in hybrid vehicle is generally greater than one hour. Consequently, even with the approximated Newton-type method, the problem dimension would become prohibitive for executing the iterations.

Motivated by the need to avoid unstable dynamics of the state and co-state in the (TPBVP) to be solved, as well as the fact that some practical problems may not have trivial continuous-time reformulations, one object is a system and method of a formulating a mixed-integer optimal control problem in discrete-time and solve the problem with single shooting. The system and method eliminates busy engine-on-off behavior arising from the optimizer by directly including transition, e.g. engine, on-to-off and off-to-on, costs in the optimizer and stabilizes the optimizer calculations to solve such a problem.

SUMMARY

An aspect is a hybrid electric vehicle that includes an internal combustion engine; a battery; an electric motor operatively coupled to the battery; and an electronic control unit configured to estimate a vehicle velocity trajectory, estimate an initial engine power trajectory, simulate state of charge of the battery with the estimated vehicle velocity trajectory and the initial engine power trajectory, and store the state of charge and the estimated vehicle velocity trajectory, estimate an initial terminal co-state value, simulate backward co-state dynamics using the saved state of charge and the estimated vehicle velocity trajectory, and store a resulting co-state trajectory, use the stored co-state trajectory to solve a minimization control and propagate state of charge dynamics forward in time, and update control and the co-state trajectory, adjust the terminal co-state value to reduce a residual for a terminal condition, and apply the updated control to control a usage of the battery and the internal combustion engine.

An aspect is a method of control of a hybrid electric vehicle, including an internal combustion engine, a battery, an electric motor operatively coupled to the battery, and an electronic control unit, the method, performed by the electronic control unit, including estimating a vehicle velocity trajectory; estimating an initial engine power trajectory; simulating state of charge of the battery with the estimated vehicle velocity trajectory and the initial engine power trajectory, and storing the state of charge and the estimated vehicle velocity trajectory; estimating an initial terminal co-state value; simulating backward co-state dynamics using the saved state of charge and the estimated vehicle velocity trajectory, and storing a resulting co-state trajectory; using the stored co-state trajectory to solve a minimization control and propagate state of charge dynamics forward in time, and updating control and the co-state trajectory; adjusting the terminal co-state value to reduce a residual for a terminal condition; and applying the updated control to control a usage of the battery and the internal combustion engine.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
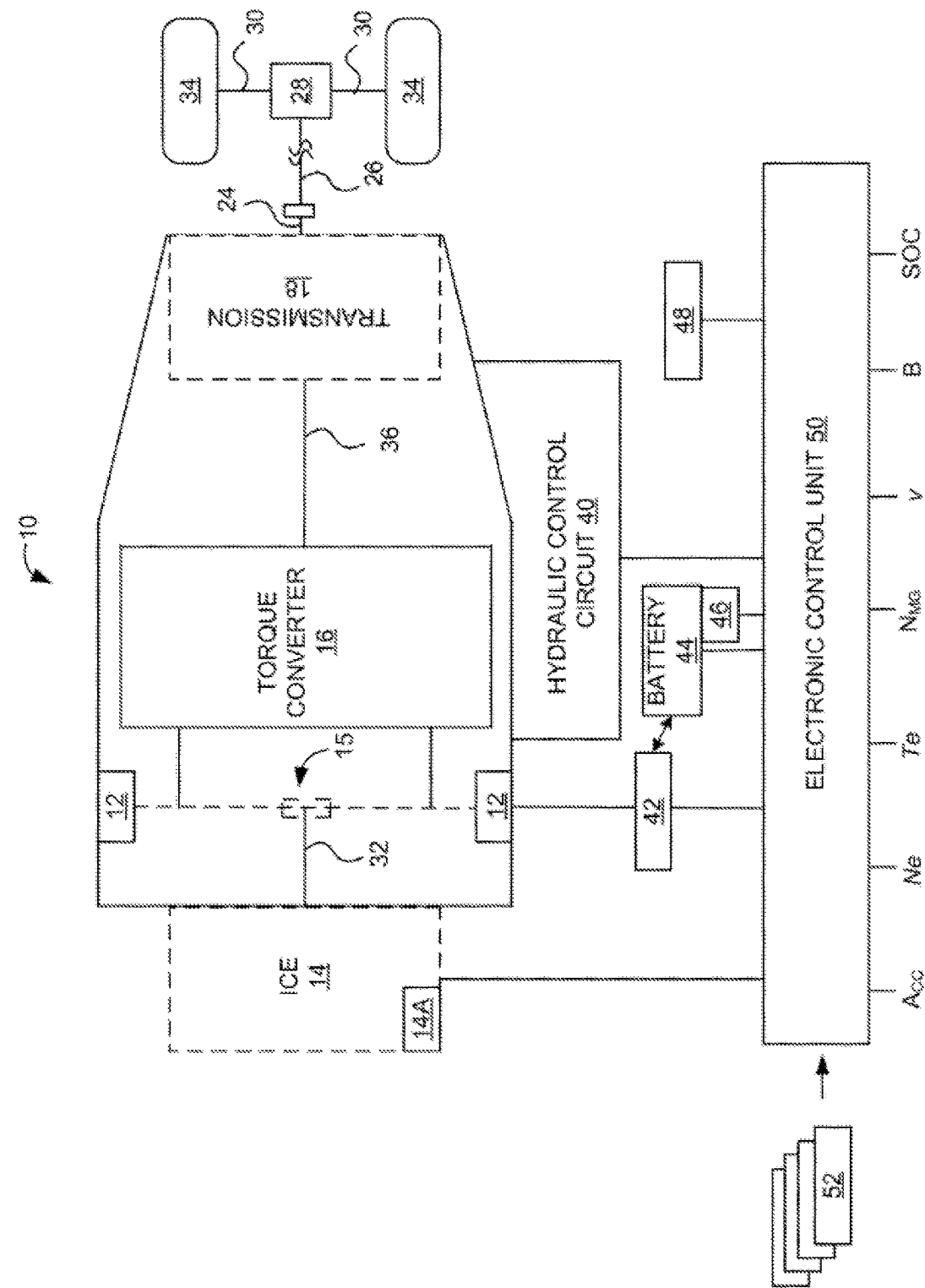
FIG. 1A is a schematic representation of a HEV in which power split control can be implemented in accordance with exemplary aspects of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

As used herein to describe power split control, the term "control variable" or "control value" generally refers to a choice of engine control parameters and/or motor control parameters for a HEV. For example, a control value may refer to a choice of engine speed and engine torque. As another example, a control value may refer to a choice of motor speed and motor torque.

As used herein, the term "co-state" generally refers to a relative cost of engine work and battery work in a HEV. A co-state may change over time because engine efficiencies and electrical efficiencies may change as a function of operating conditions.

It should be noted that the terms "optimize," "optimal" and the like as used herein can be used to mean making or achieving performance as effective or perfect as possible. Moreover, techniques disclosed herein can refer to, e.g., performing calculations, etc. that result in "more accurate" determinations. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Methods that minimize fuel consumption and battery energy usage over the course of a trip to maximize energy utilization often utilize some variation of an equivalent consumption minimization strategy (ECMS) that decides on a hybrid powertrain power split by, at each sampled time instant, minimizing a composite function of fuel consumption and "equivalent" battery energy usage. However, the fuel economy that results from using these strategies is extremely sensitive to the choice/calibration of a so-called "equivalence factor," which is a constant value used to provide "equivalent" battery usage to fuel consumption. The equivalence factor is used to tune, on average, how much fuel energy should be used and how much electrical battery energy be used such that at the end of a trip, the HEV has a battery SOC at a desired level. For example, in the case of a plug-in HEV (PHEV), the desired final SOC is as low as possible. In the case of an HEV that does not plug in to the grid, the desired final SOC may be the beginning SOC. This equivalence factor may need to be chosen differently for each drive cycle/real-life drive scenario, and may change depending on a driving task. If the equivalence factor is "chosen correctly," then significant fuel economy gains may be made for HEVs, e.g., on the order of 3-10% depending on the vehicle and the drive scenario. However, if the equivalence factor is chosen for a specified driving scenario, and the scenario changes (e.g., an un-forecasted traffic congestion occurs), there may be no effective mechanism for recalibrating the equivalence factor during the trip.

The equivalence factor is conventionally used because it is thought that it is too computationally expensive to solve in real-time (e.g., while driving) an optimization problem that accounts for all future driving conditions in deciding the ratio of fuel consumption to battery energy to use at any given moment in time. As such, standard ECMS strategies may not consider any future energy usage in the optimization problem that is solved because they may not look far ahead enough into a route driven by a vehicle.

Implementations of the disclosure are directed to addressing these drawbacks with ECMS strategies. To this end, the disclosure is directed to solving a full trajectory optimization problem in real-time (e.g., while driving) such that future driving conditions and energy usage may be fully considered in determining optimal engine energy usage and battery energy usage in real-time during a trip. In control theory, a trajectory is a time-ordered set of states of a dynamical system. State variables are variables whose values evolve through time in a way that depends on the values they have at any given time and also depends on the externally imposed values of input variables. To determine the state for all future times requires iterating the relation many times— each advancing time a small step. The iteration procedure is referred to as solving the system or integrating the system. If the system can be solved, given an initial point it is possible to determine all its future positions, the collection of points is the trajectory. For purposes of this disclosure, the trajectory is the engine power of a vehicle.

In the case of vehicle control, a control program is performed by a computer system and interacts with vehicle sensors and actuators in order to move the vehicle in the desired path. The vehicle control controls the engine power and in some cases a transmission gear position. The vehicle state is defined as present vehicle condition values as well as a future engine power trajectory. A co-state is a what-if measure of how much a cost function would change and may be reflected in changes in the vehicle state, also referred to as state dynamics. A co-state may provide hypothetical measures of cost going back in time. For example, a co-state could provide a measure of how much total fuel consumption would be reduced if more charge were injected into the battery or wire resistances were lower at an earlier point in time.

Aspects of this disclosure are directed to a hybrid electric vehicle control technique that eliminates busy-mode-switching, e.g., busy engine-on-off for HEV, PHEVs, busy shifting in ATs, arising from previously developed optimal control methodologies. An optimization control technique is disclosed that expands a capability of solving only mixed integer trajectory optimization problems for only marginally stable hybrid electric plants to also stable plants. In this optimization control technique, by reversing the co-state propagation (from forward in time to backward in time), the co-state dynamics are stabilized. This allows for additional states to keep track of mode transitions (e.g., engine cranking) and the cost of mode transitions. The optimization control technique solves the optimal control problem by minimizing cumulative fuel consumption over a trip subject to battery and power split dynamics and kinematics, where the battery should be empty at the end of the trip. As further described below, a real-time power split control may be implemented as part of an HEV power train to predict and optimize state and control trajectories all the way from a HEV's current location to the end of a commute (e.g., as specified by a mapped route). As such, unlike conventional ECMS strategies that rely on tuning an equivalence factor to "guess" future energy usage to determine a power split, implementations described herein may fully account for future conditions such as a sequence of future velocities and power demands (e.g., depending on traffic conditions and/or a mapped route) to determine an optimal power split automatically.

It should be noted that for clarity of the illustration, not all elements of HEV 10 are labeled with a reference numeral. For example, in some cases, only one of two or more elements or components of HEV 10 are labeled with a reference numeral. However, it can be assumed that the functionality and/or operation of similarly-illustrated elements or components are the same or similar, as would understood by those of ordinary skill in the art unless described otherwise. Moreover, aspects of HEV 10 may be described from the perspective of one/one set of elements or components. It can be assumed that secondary instances of those elements or components may operate the same or in a similar manner. It should also be noted that for ease of description and clarity of figures, not all components of a HEV have been illustrated, and that the figures and corresponding descriptions are not meant to be limiting. It should be further noted that a HEV may embody certain variations with respect to its elements or components, which are contemplated herein. For example HEV 10 may be configured with only a single motor.

FIG. 1A includes an example power train system of a HEV 10 that may include an engine 14 and a motor 12 as drive sources. Driving force generated by the engine 14 and the motor 12 can be transmitted to a pair of wheels 34 via a torque converter 16, an automatic transmission 18, a differential gear device 28, and a pair of axles 30. Each of the motor 12, the torque converter 16, and the automatic transmission 18 can be housed in a transmission case. The transmission case may be a splittable case made of aluminum die cast parts, for example, and fixed to a non-rotating member such as a vehicle body.

HEV 10 may be driven/powered with at least one of the engine 14 and the motor 12 as the drive source for travel. In other words, any one of a plurality of travel modes can be selectively established in the HEV 10. A first travel mode may be an engine-only travel mode that only uses the engine 14 as the drive source for travel. A second travel mode may be an EV travel mode that only uses the motor 12 as the drive source for travel. A third travel mode may be a hybrid travel mode that uses the engine 14 and the motor 12 as drive sources for travel. In the engine-only and hybrid travel modes, HEV 10 travels by using the driving force generated at least by engine 14 while a clutch 15 is engaged. In EV travel mode, HEV 10 travels by using the driving force generated by motor 12 while the engine 14 is stopped and clutch 15 is disengaged.

Engine 14 may be an internal combustion engine such as a gasoline engine or a diesel engine of an in-cylinder injection type, where fuel is injected directly into a combustion chamber. An output control device 14A is provided to control drive (output torque) of the engine 14. The output control device 14A may include a throttle actuator that controls opening and closing of an electronic throttle valve, a fuel injection device that controls fuel injection, an ignition device that controls ignition timing, and the like. The output control device 14A may execute output control of engine 14 according to a command control signal(s) supplied from an electronic control unit 50 described below. Such output control can include, for example, control of opening and closing of the electronic throttle valve by the throttle actuator for throttle control. Output control may also include control of fuel injection by the fuel injection device for fuel injection control. Further still, output control may include control of the ignition timing of the ignition device for ignition timing control.

A transmission input shaft 36 may transfer power from motor 12 and/or engine 14 to automatic transmission 18 to which a transmission output shaft 24 is attached. Connected to transmission output shaft 24 is a propeller shaft 26 coupled to differential gear device 28. Automatic transmission 18 can be a stepped transmission mechanism that selectively establishes any of a plurality of predetermined gears (gear ratios), for example, and is configured to include a plurality of engagement elements to perform such gear ratio changes. Automatic transmission 18 can include a plurality of hydraulic frictional engagement devices, such as multiple disc clutches and brakes whose engagement is controlled by a hydraulic actuator. These hydraulic frictional engagement devices may be selectively engaged or disengaged according to the hydraulic pressure supplied from hydraulic control circuit 40. Accordingly, any of a plurality of forward gears (i.e., forward gear positions or forward travel gear positions) or reverse gears (i.e., reverse gear positions or reverse travel gear positions) can be selectively established according to a combination of coupling states of the hydraulic frictional engagement devices. For example, the coupling states of the hydraulic frictional engagement devices can allow for upshifting and downshifting between the forward and reverse gears.

Motor 12 may include a rotor and stator. Motor 12 can be a motor generator that functions as a motor that generates driving force and a generator that generates reaction force. The motor 12 may be connected to a power storage device, such as a battery 44 and a capacitor via an inverter 42. The electronic control unit 50 described below may control inverter 42, adjust driving current supplied to or received from coils of the motor 12, and control driving of the motor 12. That is, output torque of the motor 12 can be increased or decreased by electronic control unit 50 through the inverter 42.

In a power transmission path between engine 14 and motor 12, clutch 15 controls power transmission in the power transmission path according to an engagement state. That is, a crankshaft 32 that is an output member of the engine 14 is selectively coupled to a rotor of the motor 12 via clutch 15. Clutch 15 is, for example, a multiple disc type hydraulic frictional engagement device whose engagement is controlled by a hydraulic actuator. Clutch 15 is controlled such that its engagement state is controlled to achieve engagement (complete engagement), slip engagement, and disengagement (complete disengagement) modes according to hydraulic pressure supplied from the hydraulic control circuit 40. That is, a torque capacity of clutch 15 is controlled according to the hydraulic pressure supplied from the hydraulic control circuit 40. When clutch 15 is engaged, power transmission is provided in the power transmission path between the crankshaft 32 and the front cover of the torque converter 16. On the other hand, when clutch 15 is disengaged, power transmission is blocked from being delivered to the power transmission path between the crankshaft 32 and the front cover of the torque converter 16. In a slip engagement state or mode, clutch 15 is engaged, and power transmission according to a torque capacity (transmission torque) of the clutch 15 is provided to the power transmission path between the crankshaft 32 and the front cover of the torque converter 16.

HEV 10 may include an electronic control unit 50. Electronic control unit 50 may include a microcomputer that includes a CPU, a RAM, a ROM, an input-output interface, and the like. In electronic control unit 50, the CPU may utilize a temporary storage function of the RAM to perform signal processing according to a program stored in the ROM. Accordingly, the electronic control unit 50 may execute various kinds of control such as drive control of the engine 14, drive control of the motor 12, speed change control of the automatic transmission 18, engagement force control of the clutch 15, engagement control of the lock-up clutch 38, and the like. These control functions may be performed in a accordance with a power split control algorithm. The electronic control unit 50 may be separately configured with a plurality of control devices such as for control of the engine 14, control of the motor 12, control of the automatic transmission 18, and control of the clutch 15 according to necessity and may execute each control through communication of information with each other. In this embodiment, the electronic control unit 50 corresponds to the control device of the HEV 10.

As shown in FIG. 1A, the electronic control unit 50 is supplied with various kinds of input signals detected by each sensor provided in the HEV 10. For example, electronic control unit 50 may receive signals that indicate an accelerator operation amount $A_{CC}$, a revolution speed $N_E$ of the engine 14 (engine revolution speed), a rotational speed $N_T$ of the turbine wheel 16B (turbine rotational speed), a rotational speed $N_{MG}$ of the motor 12 (motor rotational speed), a vehicle speed V, and energy storage amount (remaining capacity, charged amount), e.g., battery SOC of battery 44. It should be noted that more signals indicative of other operational aspects of HEV 10 can be received by electronic control unit 50, e.g., a temperature of motor 12, coolant temperature of HEV 10, intake air amount of engine 14, etc.

Electronic control unit 50 can receive the input signals from various sensors 52 configured to sense relevant operational characteristics of HEV 10. For example, accelerator operation amount $A_{CC}$ can be detected by an accelerator operation amount sensor that determines the degree to which an accelerator pedal is depressed/actuated. For example, brake operation amount B can be detected by a foot brake sensor. For example, engine revolution speed $N_e$ can be detected by an engine revolution speed sensor. The engine torque $T_e$ can be detected by an engine torque sensor. The motor rotational speed $N_{MG}$ can be detected by a motor rotational speed sensor. Vehicle speed v can be detected by a vehicle speed sensor. Battery SOC can be detected by an SOC sensor 46.

Another example of a sensor 52 may be a positioning or location sensor, such as a Global Positioning System (GPS) receiver that can provide location information corresponding to a location of HEV 10. Additionally, a sensor 52 that provides positioning or location information may provide traffic information for a current location of HEV 10 and an expected route of HEV 10. Additionally, electronic control unit 50 can receive input signals from a network interface device 48. Network interface device 48 may receive information such as map data, road conditions information, traffic information, and the like from one or more information service providers. For example, such information may be retrieved using vehicle-to-vehicle (V2V) communications, vehicle-to-infrastructure (V2I) communications, and/or vehicle-to-cloud (V2C) communications. Instead of relying solely on a GPS receiver, a location of HEV 10 may be determined from information received by network interface device 48.

Electronic control unit 50 can supply various output signals to one or more devices/components/elements provided in HEV 10. For example, the electronic control unit 50 can supply signals to output control device 14A of the engine 14 to effectuate drive control of the engine 14. Electronic control unit 50 can supply signals to inverter 42 for effectuating drive control of the motor 12. Electronic control unit 50 can supply signals to a plurality of electromagnetic control valves in the hydraulic control circuit 40 for speed control of the automatic transmission 18. Electronic control unit 50 may supply signals to a linear solenoid valve in the hydraulic control circuit 40 for engagement control of the clutch 15.

Figure 1B:
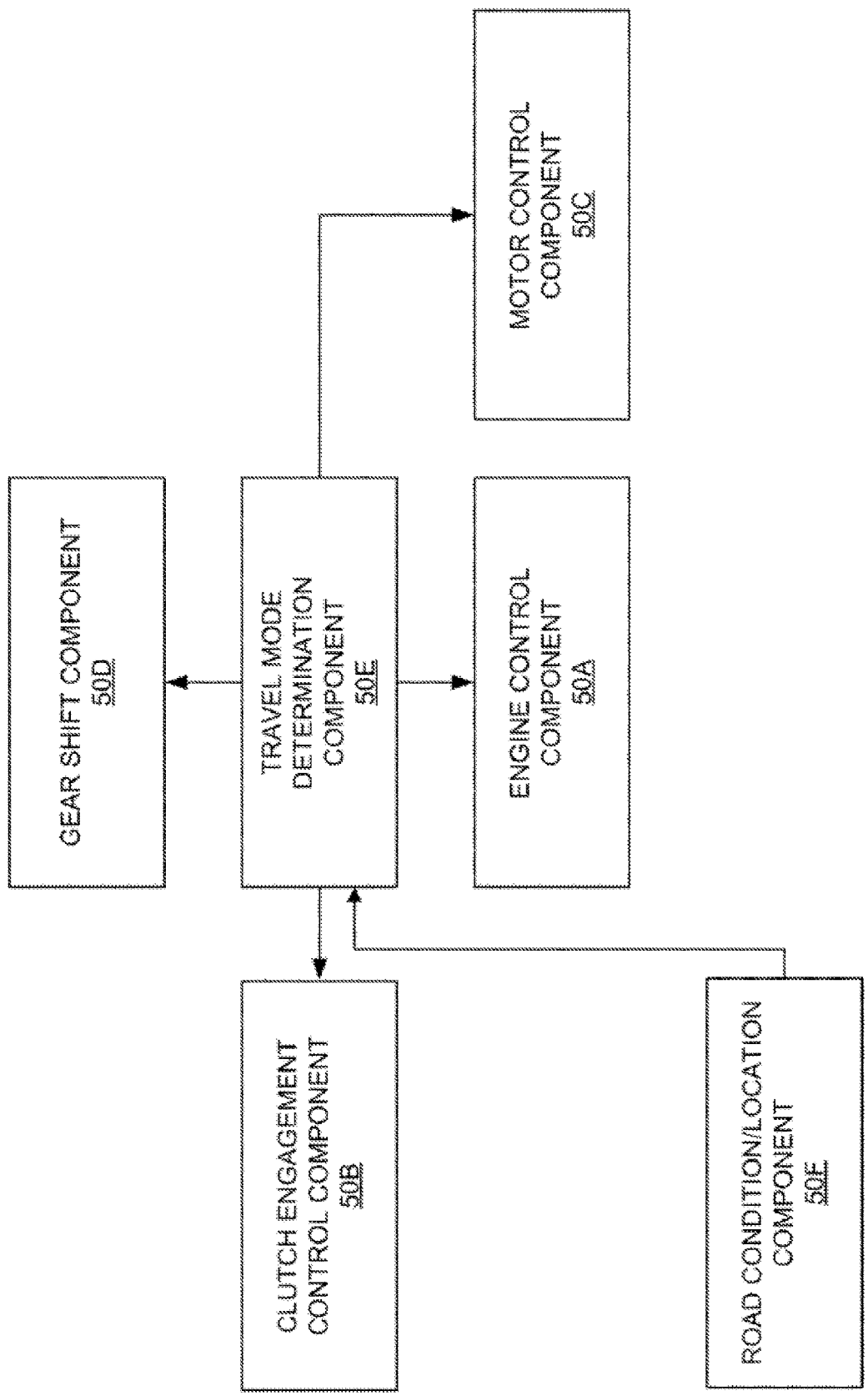
FIG. 1B is a functional block diagram that illustrates component parts of a control function included in an electronic control unit of the HEV of FIG. 1A.

FIG. 1B is a functional block diagram that illustrates example parts of a control function that may be included in the electronic control unit 50. An engine control component 50A shown in FIG. 1B controls the drive (output torque) of the engine 14 via the output control device 14A. Specifically, engine control component 50A controls output control device 14A by way of a throttle valve opening of an electronic throttle valve, controlling the amount of fuel supplied by the fuel injection device, the ignition timing of the ignition device, etc. Accordingly, electronic control unit 50 controls the manner in which engine 14 provides drive power so that engine output required by engine 14 can be achieved.

Engine control component 50A drives engine 14 in the engine-only and hybrid travel modes. For example, engine control component 50A may control when engine 14 is started, e.g., when switching from EV travel mode to the engine-only travel mode or the hybrid travel mode. This can occur when the HEV is transitioning from the EV travel mode to the hybrid travel mode. Likewise, engine control component 50A may control when engine 14 is shut off, e.g., when switching from engine-only or hybrid travel mode to EV travel mode.

To control engine 14, clutch 15 may be engaged (slip or complete engagement) so as to connect engine 14 to the power transmission path. This can be accomplished by clutch engagement control component 50B, described below. Engine control component 50A can instruct engine 14 to revolve, resulting in an engine revolution speed $N_E$, and the supply of fuel to engine 14 is started via the output control device 14A.

When HEV 10 is to be operated in EV mode, engine control component 50A outputs a control signal(s) to output control device 14A for stopping engine 14. Clutch 15 may be disengaged, and engine 14 is stopped. Moreover, output control device 14A may be commanded to stop the supply of fuel to engine 14.

A motor control component 50C controls actuation of the motor 12 via the inverter 42. Specifically, electric energy is supplied from battery 44 to motor 12 via inverter 42. Motor control component 50C outputs a control signal(s) for driving motor 12 to rotate and generate positive or negative motor torque to obtain the output required of the motor 12. For example, motor control component 50C outputs a control signal(s) to switch inverter 42 so that current is flowing to battery 44 so as to generate negative motor torque such that HEV 10 decelerates.

A gear shift component 50D can output a control signal(s) instructing engagement/disengagement of one or more hydraulic frictional engagement devices through hydraulic control circuit 40 to effectuate a downshift to a lower gear ratio from a current gear ratio. The downshift can be initiated by a control signal(s) from a travel mode determination component 50E, described below.

A travel mode determination component 50E can make determinations regarding a travel mode established in HEV 10 on the basis of present and future driving conditions. A determination can be made regarding which travel mode (EV, engine-only, hybrid) HEV is in on the basis of, e.g., vehicle velocity v, accelerator operation amount $A_{CC}$, battery SOC, brake operation amount B, power demand, engine revolution speed $N_e$, engine torque $T_e$, torque demand, etc. In embodiments, further described below, travel mode determination component may make a determination of which travel mode to utilize using a real-time power split algorithm, further described below.

A road conditions/location component 50F can make determinations regarding a location of HEV 10, as well as road conditions and/or traffic conditions forecasted for the trip. In one embodiment, road conditions/location component 50F may embody a navigation unit commonly found in many modern vehicles, hybrid or otherwise. Road conditions/location component 50F may receive information regarding road conditions from network interface device 48 and/or a GPS receiver, which may be one embodiment of a sensor 52. For example, the location of HEV at any point during its travel can be determined, e.g., by the GPS receiver, and this location can be correlated with road conditions information relevant to that location.

For example, upon startup or during operation of HEV 10, road conditions/location component 50F may determine a route to be traveled is known. The route may be known if an address, point of interest identifier, etc. is provided to a road conditions/location component 50F, for example, by a driver of HEV 10, via navigation system user interface. Road conditions/location component 50F may have or receive maps or map information indicative of the route to be traveled along with road conditions, e.g., any downhill grades present/expected along the route.

Figure 2:
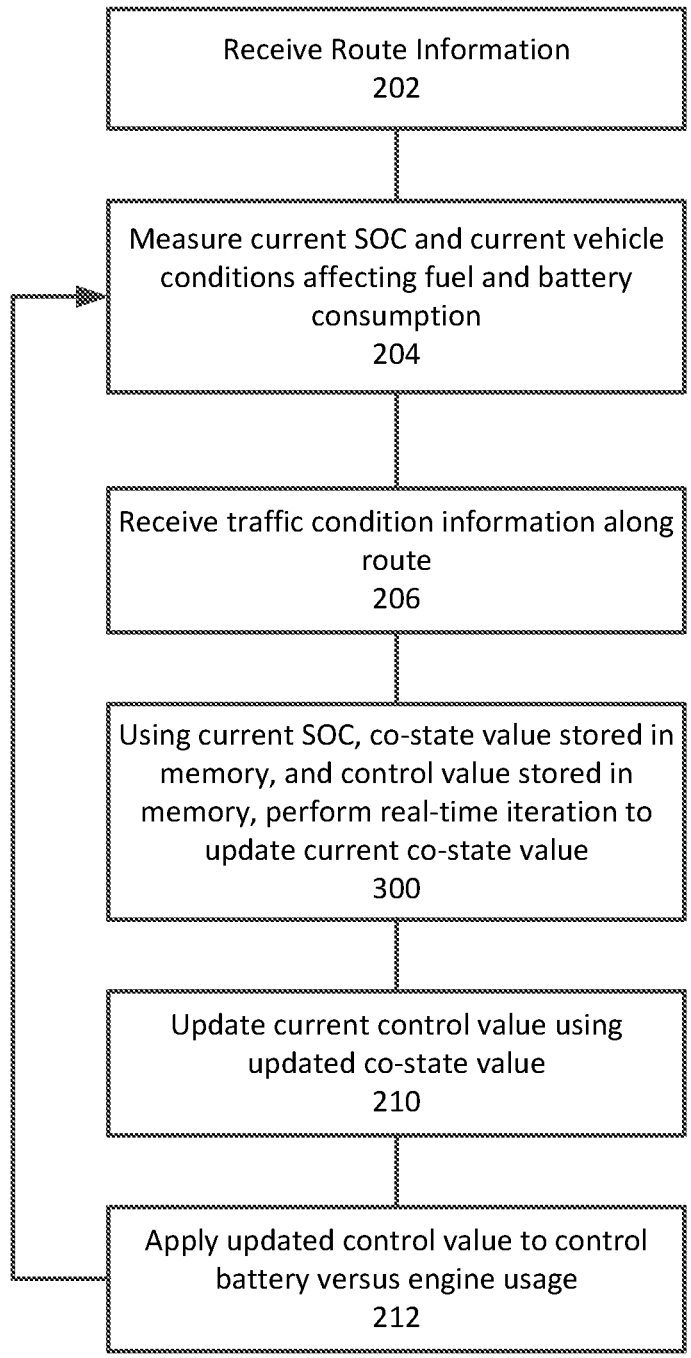
FIG. 2 is a flowchart of a method that may be performed to control battery SOC in accordance with exemplary aspects of the disclosure.

FIG. 2 is an operational flow diagram illustrating example method 200 of implementing a real-time power split control in a HEV, in accordance with implementations of the disclosure. In implementations, method 200 may be implemented by executing instructions stored in an electronic control unit 50 of a HEV. For example, one or more components 50A-50F may be used to realize method 200.

During implementation of method 200, a co-state variable, which represents a relative cost of engine work and battery work in the HEV, may be dynamically updated in response to present conditions and forecasted future conditions of the drive. Each time the co-state variable is updated, a control variable for controlling a power split of the HEV may be updated. For example, present conditions that may be used to update the co-state variable may include a battery SOC, a present HEV velocity, and present power demanded by the driver. Forecasted future conditions that may be used to update the co-state variable may include a sequence of future velocities and power demands for a remainder of the trip. These future velocities and power demands may be forecasted using a combination of a determined route and forecasted driving conditions for that determined route. For example, the forecasted driving conditions may be retrieved using vehicle-to-vehicle, vehicle-to-infrastructure, or, vehicle-to-cloud communications.

By virtue of dynamically updating the co-state variable (e.g., every second) to account for the fact that the relative cost of engine work and battery work in a HEV changes over time as engine efficiencies and electrical efficiencies change in response to driving conditions, energy consumption efficiency may be optimized. This contrasts with conventional ECMS that assume a constant equivalence factor.

Prior to implementing method 200, fuel energy consumption and battery energy consumption of the HEV may be modeled as a function of various parameters. For example, as further described below with reference to particular mathematical implementations, fuel energy consumption may be modeled as a function engine speed and engine torque. Additionally, battery energy consumption may be modeled as a function of one or more of SOC, velocity, torque demand, engine speed, and engine torque. The modeling of these functions may be determined prior to the manufacture of the HEV and may be embedded in electronic control unit 50 as a component of instructions for implementing a real-time power split. At operation 202, route information is received. For example, a driver or other user of the HEV may enter route information into a navigation system of the HEV during a beginning of a drive. As another example, the route information may be received in response to the HEV recomputing a navigation route of the HEV. Subsequently, operations 204-212 may be iteratively repeated to control for a power split of the HEV while it navigates through the route.

At operation 202, route information is received. For example, a driver or other user of the HEV may enter route information into a navigation system of the HEV during a beginning of a drive. As another example, the route information may be received in response to the HEV recomputing a navigation route of the HEV. Also, a velocity vector trajectory may be forecasted based on the route information. Subsequently, operations 204-212 may be iteratively repeated to control for a power split of the HEV while it navigates through the route.

At operation 204, a current SOC of the HEV's battery (e.g., current battery level) and other present vehicle conditions affecting fuel and battery consumption are measured. For example, in addition to the current SOC, a current velocity, and power demand of the vehicle may be measured.

At operation 206, current traffic information along the route may be received. For example, a network interface of the HEV may query one or more services for traffic conditions along the route. The received traffic information may be used to update a forecast of future velocities and/or power demands for a remainder of the route taken by the HEV.

At operation/method 300, using the measured SOC, a co-state value stored in memory, and a control value stored in memory, a real-time iteration may be performed to iteratively update a current co-state value. During each iteration of this iteration process, starting with the currently measured SOC and initial co-state value, the SOC, co-state value, and control value may be calculated one time step (e.g., one second) into the future taking into the account the HEV energy usage model equations and forecasted conditions. This iteration process may be repeated until the number of time steps match the expected end of the trip or until there is no longer any computation time available. A particular implementation of method 300 is further described below with reference to FIG. 4.

At operation 210, the current control value may be updated using the updated co-state value. In implementations, the current control value may be updated by using the measured SOC and updated co-state value to choose an updated control value that minimizes a sum of a current fuel consumption rate and a rate-of-change of battery SOC times the updated co-state value. For example, the derivative of the sum may be taken, and a control value chosen that is the zero or close to the zero of the derivative.

At operation 212, the updated control value may be applied to control present battery usage versus engine usage of the HEV. In some implementations, the updated control value may cause the HEV to change travel modes (e.g., to an EV mode, an engine-only mode, or hybrid mode). In some implementations, the updated control value may not cause a change in travel mode but may reduce battery usage while increasing engine usage or vice versa.

Thereafter operations 204-212 may iterate. For example operations 204-212 may iterate until the trip ends. In implementations, the rate of iteration of operations 204-212 may be preconfigured in a memory of electronic control unit 50. For example, in some implementations, operations 204-212 may be preconfigured to iterate every half second, every second, every two seconds, or during some other predetermined iteration time interval. The rate of iteration may be set depending on a desired accuracy of power split, computational power, and/or other relevant factors.

For a human-driven plug-in electric vehicle the velocity trajectory for a predetermined trip is determined by the driver, and the driver demanded torque tp is a nonlinear regression model of the acceleration a and velocity v $$tp = (\alpha 1 v^2 + \alpha 2 v + \alpha 3 + Ma) R_t$$

where $\alpha i, i \in \{1, 2, 3\}$ are the regression parameters and M is the effective mass (including the rotational inertia) of the vehicle, $R_t$ is the tire radius.

The battery SOC is the only state considered in the hybrid powertrain subsystem, and its dynamics are given by $$\dot{SOC} = -\frac{V_{oc}(SOC) - \sqrt{V_{oc}^2(SOC)^2 - 4P_{batt}R_b}}{2C_b R_b(SOC)}$$

where $V_{oc}(SOC)$ and $R_b(SOC)$ are SOC-dependent open circuit voltage and internal resistance of the battery, respectively. $C_b$ is the battery capacity. The battery power $P_{batt}$ is a nonlinear function of the vehicle velocity v, the driver demanded torque tp, the engine torque tc and speed ne. The fuel rate $\dot{m}_f$ is modeled as a static map as a function of the engine torque te and speed ne $$\dot{m}_f = \dot{m}_f(ne, te).$$

The minimum fuel consumption problem with SOC dynamics for a given trip is formulated in continuous-time as Minimize $$J = \int_0^{t_f} \dot{m}_f(u) dt$$

subject to SOC dynamics

SÒC=$f$(SOC,$u,v,tp$)

the initial and desired terminal SOC

SOC(0)=SOC$_{int}$,SOC($t_f$)=SOC$_f$, and the control constraints (the constraints on motor MG2 and generator MG1 are converted to constraints on u)

$u \in U$, with $U = \Omega \cup [0,0]^T$ where u=[ne, te] is the control input. $\Omega$ is the constraint polyhedron on engine torque te and speed ne when engine is on. The velocity v is the given external input. The acceleration a=$\dot{v}$ and the driver demanded torque tp are obtained from the velocity trajectory forecast.

Figure 3:
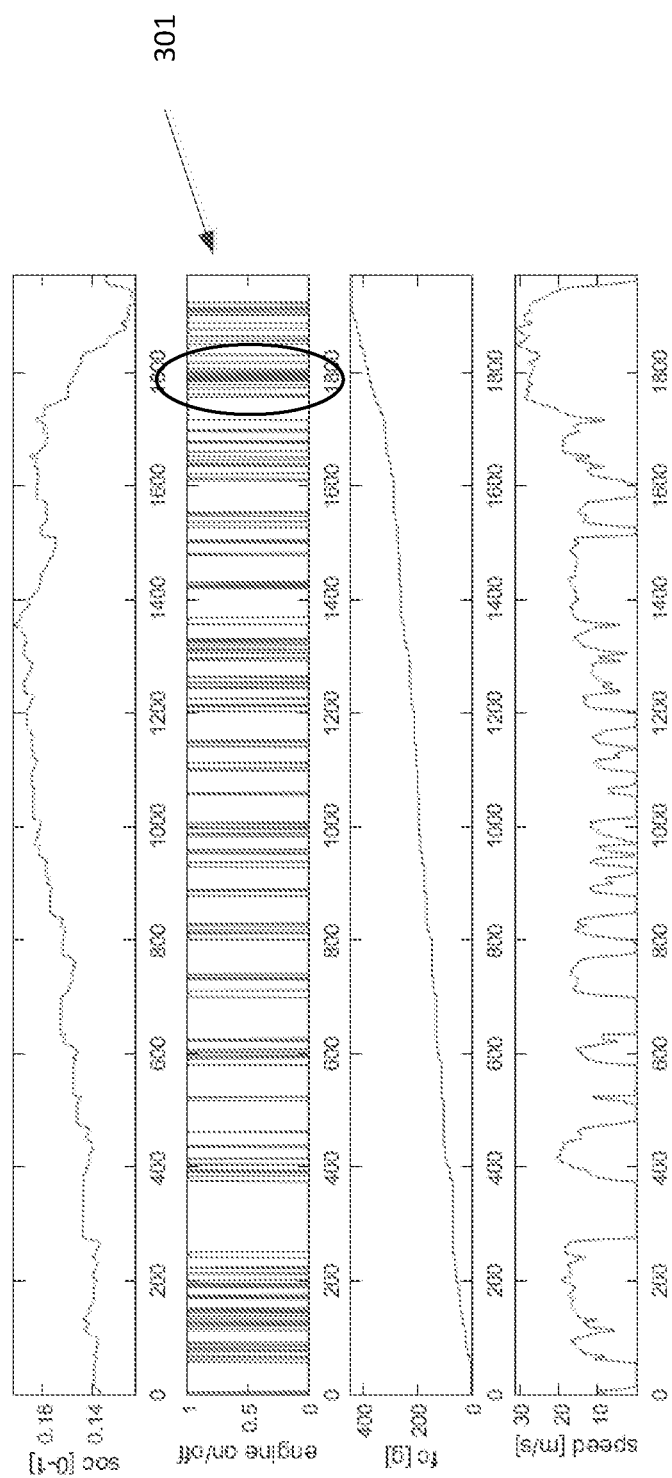
FIG. 3 are graphs illustrating busy engine on/off in a conventional solution to the optimal control problem.

As noted above, when the calculation of the optimal trajectory by an instantaneous Hamiltonian minimization does not include cranking cost (i.e., fuel needed to start the engine), it has been determined that there is an unusually high transition between engine on and engine off, referred to herein as chattering behavior. FIG. 3 illustrates a high transition rate for engine on/off transition 301 that has been found to occur in a conventional approach to optimal control. FIG. 3. shows engine speed over the course of a trip, and resulting fuel consumption (fc) and battery state of charge (SOC).

One technique to address the chattering behavior observed in the instantaneous Hamiltonian minimization, the minimization may be augmented with the engine cranking dynamics and their associated cranking cost.

In particular, the minimization may be formulated as minimizing J=

$$\int_0^{t_f} \{\dot{m}f(u) + mc \cdot \max(\dot{e}(e, E), 0)\} dt$$

subject to the SOC dynamics of the concise form (4b) and the normalized engine cranking dynamics modeled as $\dot{e} = -\beta e + \beta E, \beta > 0,$ where $\dot{m}f$ is the fuel rate, u is the control input, $E \in \{0, 1\}$ is the engine on/off command. $m_c$ is the constant cranking penalty, which corresponds, physically, to the cranking event energy cost (not a tuning parameter), and $\beta$ is the inverse of the time constant for the engine cranking dynamics. In addition, u is subject to the control constraints (in which constraints on motor MG2 and generator MG1 are converted to constraints on u).

$u \in U$, with $U = \Omega \cup [0, 0]^T$ where $\Omega$ is the constraint polyhedron on engine torque and speed when the engine is on. The necessary condition for optimizing the minimization yields H=$\dot{m}_f$+$m_c \cdot \max(\dot{e}, 0) + p_1 \cdot$ SÒC+$p_2 \cdot \dot{e}$, where $$\dot{p}1 = -\frac{\partial H}{\partial SOC} = -\frac{\partial S\dot{O}C}{\partial SOC} \cdot p_1$$

$$\dot{p}2 = -\frac{\partial H}{\partial e} = \beta \cdot p2 + \beta \cdot m_c \cdot \Pi(\dot{e} > 0),$$

where $\Pi(\cdot)$ is the indicator function.

However, in this technique it has been determined that although the engine cranking has stable dynamics, the unforced dynamics of the co-state $p_2$ are unstable.

A discrete-time maximum principle is used to obtain first-order necessary conditions for optimality resulting in stable co-state dynamics and a two-point boundary value problem (TPBVP) may be solved. In particular, real-time power split control for a HEV may involve the solution of a minimization problem $$\min \sum_{k=0}^{N-1} \Delta t \dot{m}_f(u) + c \max(0, (\alpha - 1)\tilde{u}_k + (1 - \alpha)u_k)$$

SOC$_{k+1}$=SOC$_k$+$\Delta t f(u_k,$SOC$_k)$ $\tilde{u}_{k+1} = \alpha \tilde{u}_k + (1-\alpha) u_k$ SOC$_N$=$\underline{SOC}$ The fuel consumption rate is $\Delta t \dot{m}_f(u)$.

The cost to turn on (crank) the engine includes a cost in amount of fuel and a time lag. The cost in terms of amount of fuel to crank an engine is generally a fixed amount, such as c=0.28 grams. The real engine state, $\tilde{u}$, is modeled as a filter of the engine on-off command, u, with a time constant $\alpha$, $\tilde{u}_{k+1} = \alpha \tilde{u}_k + (1-\alpha)u_k$.

The cost of the engine going from off to on is c max $(0,(\alpha-1)\tilde{u}_k + (1-\alpha)u_k)$ which is equal to c when accumulated over the duration of the off to on transition.

The cost of the engine going from off to on is c max $(0,(\alpha-1)\tilde{u}_k + (1-\alpha)u_k)$, which is equal to zero.

In one embodiment, the cost function includes a condition that the SOC of the battery at the end of a trip will be zero, and the objective of the optimization is to optimize fuel consumption over the course of the trip. The solution to the minimization problem must satisfy the following properties which are processed in the ECU.

Figure 4:
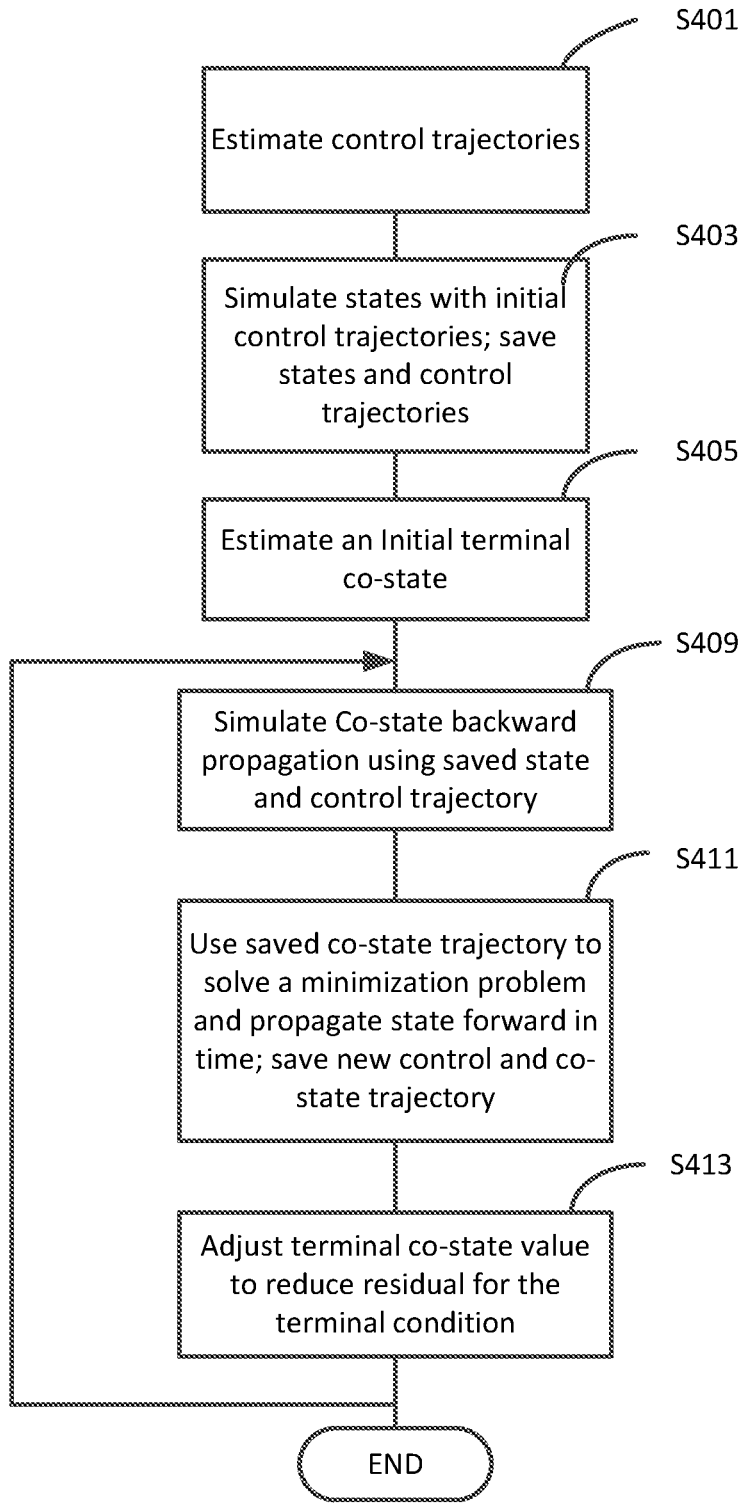
FIG. 4 is a flowchart of a method of performing a real-time iteration to update a co-state value for power split control in a HEV in accordance with exemplary aspects of the disclosure.

$H(u_k, SOC_k, \tilde{u}_k, p_{1,k+1}, p_{2,k+1}) =$
$\quad \Delta t \dot{m}_f(u) + c \max(0, (\alpha-1)\tilde{u}_k + (1-\alpha)u_k) +$
$\quad p_{1,k+1} SOC_{k+1}(SOC_k, u_k) + p_{2,k+1} \tilde{u}_{k+1}(u_k, \tilde{u}_k)$ $u_k = \text{argmin}_{u \in U} H(u, SOC_k, \tilde{u}_k, p_{1,k+1}, p_{2,k+1})$ $$p_{1,k} = \frac{\partial H(u_k, SOC_k, \tilde{u}_k, p_{1,k+1}, p_{2,k+1})}{\partial SOC}$$

$$p_{2,k} = \frac{\partial H(u_k, SOC_k, \tilde{u}_k, p_{1,k+1}, p_{2,k+1})}{\partial \tilde{u}} =$$
$\quad m_c(\tilde{\alpha} - 1)\Pi(\tilde{u}_{k+1} - \tilde{u}_k > 0) + \tilde{\alpha} p_{2,k+1}, \tilde{\alpha} = 1 - \Delta t \beta \in (0, 1)$ $p_{2,N} = 0$ SOC$_{k+1}$=SOC$_k$+$\Delta t f(u_k,$SOC$_k)$ $\tilde{u}_{k+1} = \alpha \tilde{u}_k + (1-\alpha) u_k$ SOC$_N$=$\underline{SOC}$ Here, $p_2$ is stable because $\alpha \in (0,1)$, $p_{1,N}$ is the unknown variable and $SOC_N = \underline{SOC}$ is the terminal condition to be satisfied and the operations to solve this TPBVP is described in FIG. 4. FIG. 4 is an operational flow diagram of the method to be performed by the ECU, in accordance with particular implementations of the disclosure. Prior to implementing method 300, a current SOC may be measured (e.g., as part of operation 204).

Step S401: estimate a vehicle velocity trajectory and an initial engine power trajectory. An estimate of the vehicle velocity trajectory may be forecasted in 202 of FIG. 2. The actual velocity vector is determined by a driver. The vehicle driver requests power to be delivered to the wheels through a pedal. The method determines how the demanded power is split between a battery and an engine and the total equals to the driver request.

Step S403: simulate states with the initial control trajectory, save the states and control trajectory.

Step S405: estimate an initial value for the terminal co-state value.

Step S409: simulate backward co-state dynamics using saved state and control trajectory, save co-state trajectory.

Step S411: use saved-co-state trajectory. to solve the arg-min problem and propagate state dynamics forward in time. Save the new control and co-state trajectory.

Step S413: adjust the terminal co-state value to reduce the residual for the terminal condition, e.g., using a newton step; and return to step S409. Values of the engine power trajectory change at each iteration through steps S409 to S413 in order to reduce fuel consumption.

Figure 5:
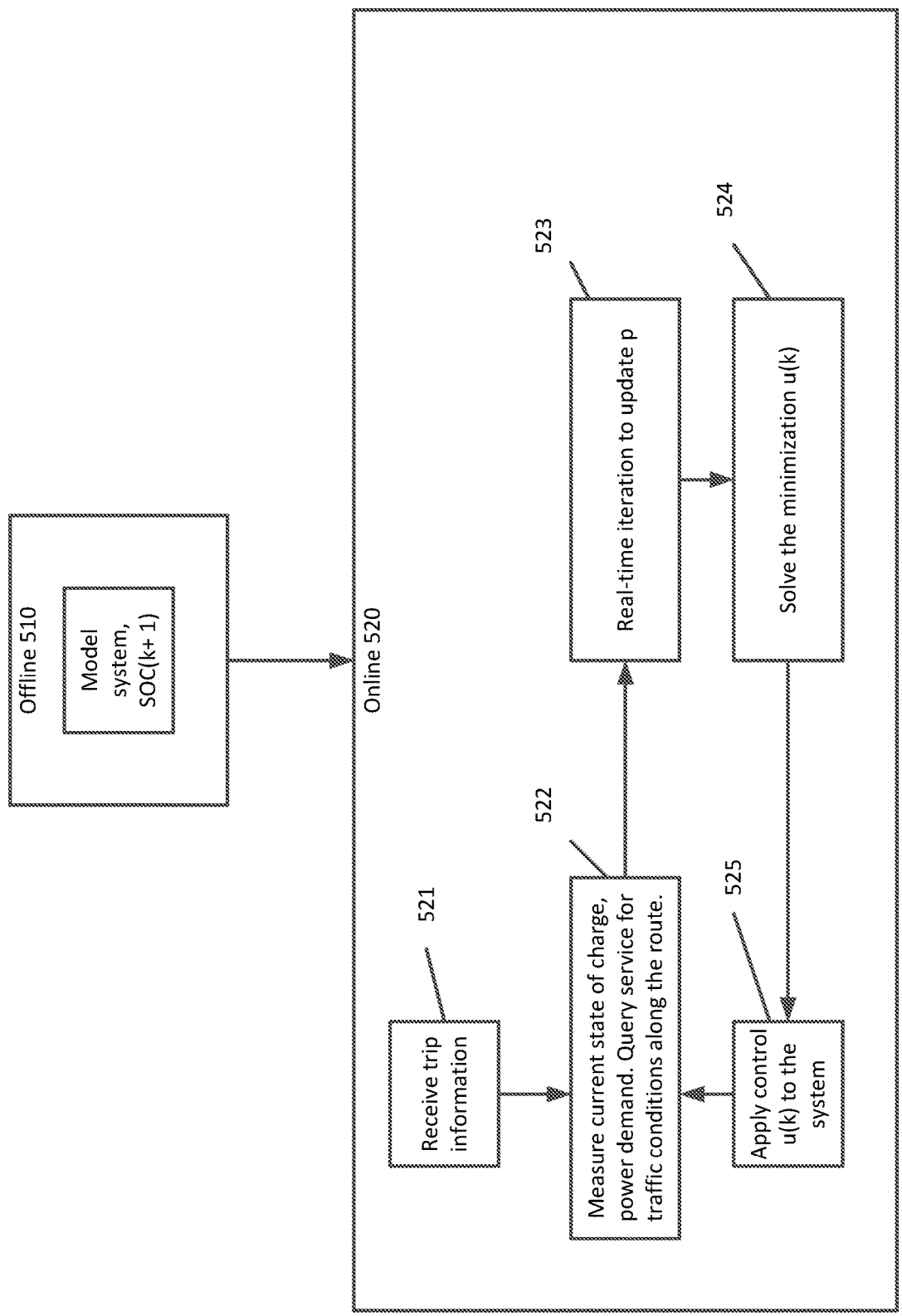
FIG. 5 is a block diagram illustrating a closed loop HEV and power split control system in accordance with exemplary aspects of the disclosure.

FIG. 5 is a block diagram illustrating a real-time power split control in a HEV in accordance with implementations of the disclosure. In particular, As illustrated, in an offline state 510 (e.g., prior to use of the real-time power split control), at block 511 a battery SOC of the HEV may be modeled as a function of rate of change of SOC.
In an online state 520 (e.g., during HEV travel), real-time power split control may performed.

At block 521, route information may be received. For example, block 521 may correspond to operation 202 of method 200. Thereafter, the real-time power split control loop may iterate. At block 522, a current SOC, and power demand may be measured. Additionally, a service may be queried for conditions along the route. Block 522 may correspond to operations 204-206 of method 200.

At block 523, a real-time iteration to update a co-state value p may be performed. At block 524, after updating the co-state value, an instantaneous consumption minimization problem, $u_k$, may be solved to update a control value for the current time sample t. Block 524 may correspond to operation 210 of method 200.

At block 525, the updated control value may be applied to the power train of the HEV. Block 525 may correspond to operation 212 of method 200.

Figure 6:
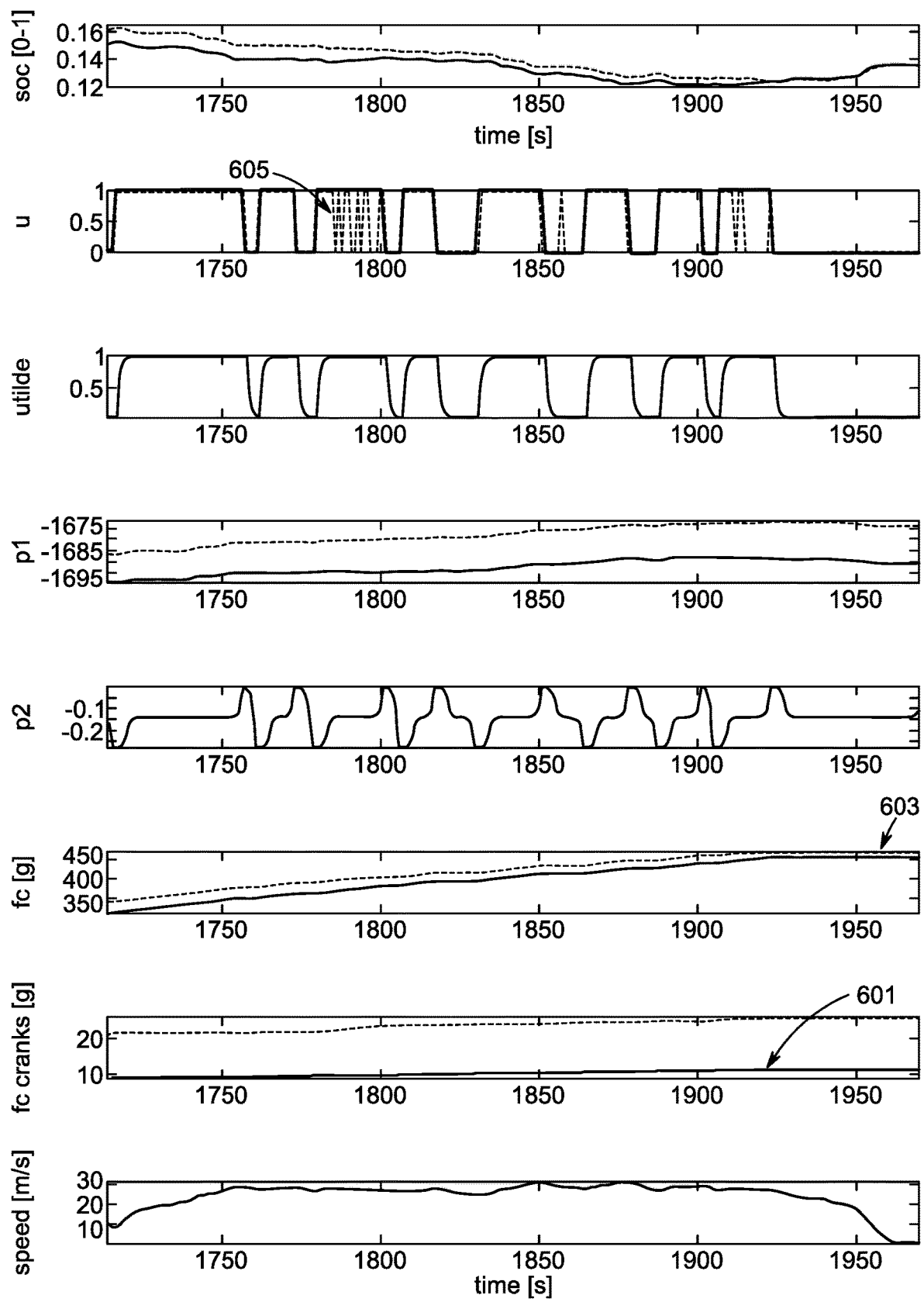
FIG. 6 are graphs illustrating a solution to an optimization control problem when cranking cost is included in accordance with exemplary aspects of the disclosure.

FIG. 6 are graphs illustrating a solution to an optimization control problem when cranking cost is included in accordance with exemplary aspects of the disclosure. The graphs show curves for a baseline power split optimization without engine cranking state (dotted line) and the optimization result of the TPBVP system when cranking cost is included (solid line). The graphs are based on engine speed over the course of a trip and show resulting state p1, co-state p2, control output u, and battery state of charge (SOC). When cranking cost is included in the optimization, fuel consumption due to engine cranks 601 is reduced by about half. The chattering phenomenon 605 is substantially eliminated. The total fuel consumption 603 is reduced by about 2.7%.

[Test Case]

In order to test an implementation of the TPBVP system, experiments were conducted with a 2016 Toyota Prius Prime with a Model Predictive Controller (MPC) corresponding to the optimal control problem on a chassis dyno at Southwest Research Institute. For each experiment, a drive cycle is selected, then the velocity trace is shown on a driver's aid screen for a human driver to follow. The velocity trace and the estimated torque demand trace are also given to the Model Predictive Controller to be used in the prediction and optimization. In these experiments, the velocity forecast is essentially perfect, with some variations introduced by the fact that a human is following a target velocity trace.

For the MPC in these experiments, the prediction horizon is sufficiently long to cover the entire trip, which in the test scenario is 8000 sec. (N=8000 and $\Delta t$=1 sec). Every second, the state SOC(t) is sampled, the auxiliary state $\tilde{e}(t)$ is computed, and a single shot is performed composed of the co-state backward propagation, forward simulation, and terminal co-state correction. The state and co-state trajectories are then shifted by 1 sec and used to warm start the shot for the next sample. When implemented on a dSPACE MicroAutoBox II, a single shot can be completed in 0.64 sec. In the experiments $\mu_i = \mu_0 = 0$.

Differently than typical MPCs, where the first element of the optimal control vector is applied to the system, a co-state vector is used to recalculate the control at a higher sampling frequency. In this way, the controller reacts to real-time variations in vehicle speed and torque demand, which can vary at a higher frequency than the slower battery dynamics and the 1 Hz the MPC is operating at. In these experiments, the control is recalculated every 8 msec, which gives fast reaction time as the driver torque demand changes. Every 8 msec, the control [uk, Ek] is obtained by solving the instantaneous consumption minimization problem $$[u_k, E_k] \in arg\ min\{\Delta t \dot{m}_f(u) + m_c \max(\tilde{\alpha}\tilde{e}(t) + (1-\tilde{\alpha})E - \tilde{e}(t), 0) + p_1(t)(SOC(t) + \Delta tf(SOC(t), u, v(t), tp(t))) + p_2(t)(\tilde{\alpha}\tilde{e}(t) + (1-\tilde{\alpha})E)\}, u \in U, E \in \{0,1\}$$

where $p_1(t)$ and $p_2(t)$ are obtained by interpolation of the co-state vector in the MPC.

Figure 7:
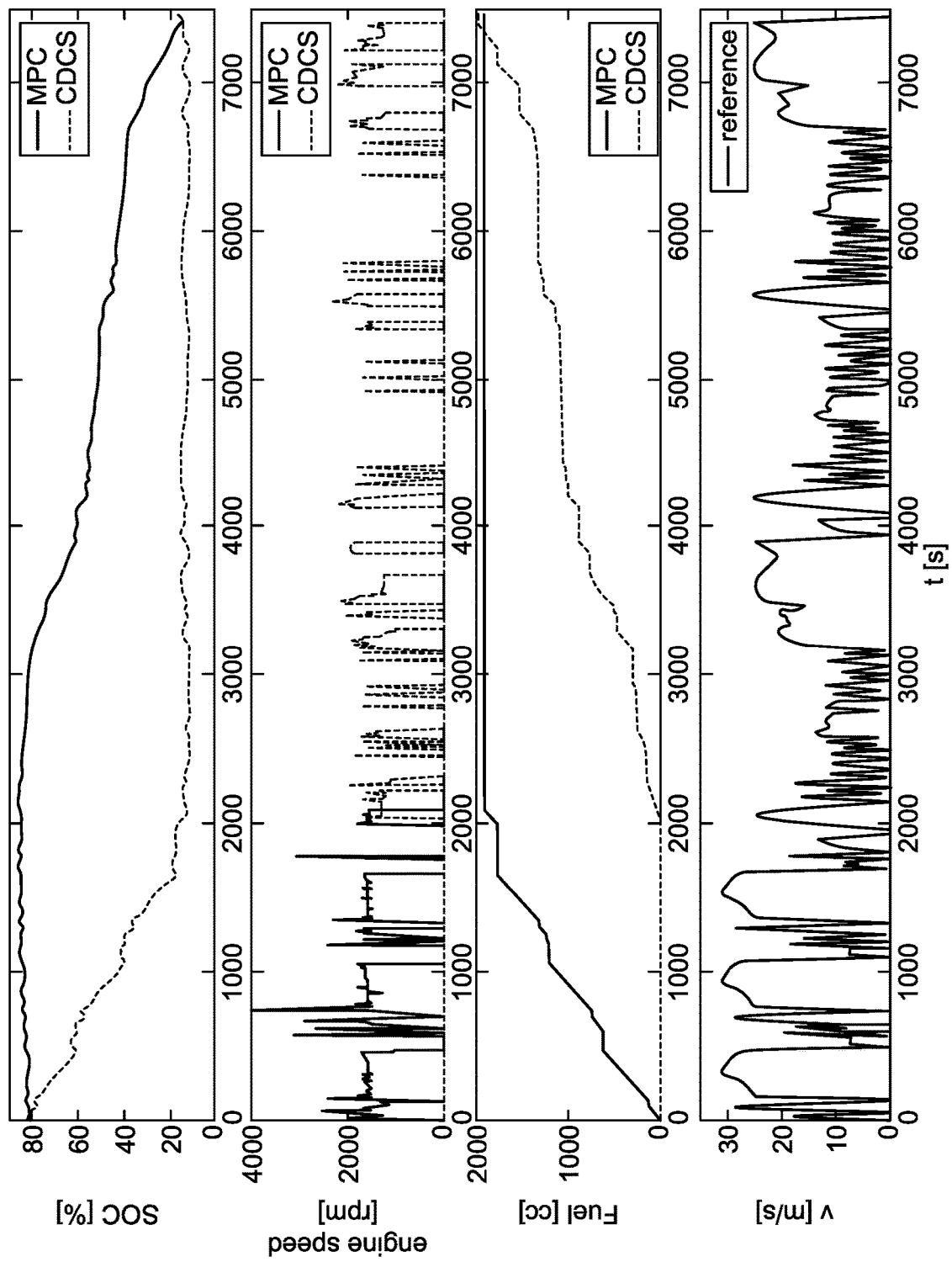
FIG. 7 are graphs of test results on a smooth driving cycle.

Examples of the SOC, engine speed, the reference vehicle speed v that a human driver tries to follow, and the fuel consumption traces measured during dyno test with MPC and stock EV-HV are presented in FIG. 7. Their corresponding fuel consumption values are reported in Table. I. As can be seen in the table, a 5.6% fuel consumption reduction is achieved by using the MPC compared to stock EV-HV, which demonstrates the real-time feasibility of the methodology.

TABLE 1

Summary of dyno test results

| Controller | Fuel |
|---|---|
| MPC | 1874 |
| Stock EV-HV | 1986 |

[Car Following]

The approach that includes a back-propagation of co-states starting from $p_n$, is efficient enough that the system can now handle stable systems and an integrator system. Car following involves controlling the speed of the host vehicle to follow the speed of a preceding vehicle in a fuel efficient manner. Car following makes use of a control system that controls the host vehicle including a control computer and sensors, such as a camera array, radar, and in some cases LiDAR. Generally, the host vehicle is a self-driving vehicle and the preceding vehicle may be an autonomous vehicle or a human driven vehicle. The state of a host vehicle is a present vehicle position and vehicle velocity.

In controlling a self-driving vehicle, car following is considered a double integrator. An integrator in measurement and control applications is defined as an element whose output signal is the time integral of its input signal. It accumulates the input quantity over a defined time to produce a representative output. Double integrating small numerical perturbations over long horizons is not good, i.e., effectively unstable. To handle, the car follower is pre-stabilized with the car following speed controller vehicle velocity $v_k$, and vehicle acceleration $a_k$.

$$v_k = K_k(x_{lead,k} - x_k)$$

$$a_k = (v_k - v_{k-1})/\Delta t$$

The gain $K_k$ is optimized. As such, the follow window can be enforced as a control constraint on $K_k$, such as $0.3 \leq K_k \leq 1.5$. The cost function and constraints with the inclusion of car following is as follows. Variables in the cost function and constraints are the same as in the power-split optimization described above.

$$\min \sum_{k=0}^{N-1} \Delta t \dot{m}_f(u) + c \max(0, (\alpha-1)\tilde{u}_k + (1-\alpha)u_k)$$

$$SOC_{k+1} = SOC_k + \Delta t f(u_k, SOC_k, \tilde{v}_k, x_k)$$

$$\tilde{u}_{k+1} = \alpha \tilde{u}_k + (1-\alpha) u_k$$

$$\tilde{v}_{k+1} = K_k(x_{lead,k} - x_k)$$

$$x_{k+1} = x_k + \Delta t K_k(x_{lead,k} - x_k)$$

$$SOC_N = \underline{SOC}$$

The cost function may be transformed into a system that is processed in the ECU. $[u_k, K_k] = \arg\min_{u \in U, 3 \leq K \leq 1.5} H(u, K, SOC_k, \tilde{u}_k, \tilde{v}_k, p_{1,k+1}, p_{2,k+1}, p_{3,k+1}, p_{4,k+1})$ $$p_{1,k} = \frac{\partial H(u_k, K_k, SOC_k, \tilde{u}_k, \tilde{v}_k, x_k, p_{1,k+1}, p_{2,k+1}, p_{3,k+1}, p_{4,k+1})}{\partial SOC}$$

$$p_{2,k} = \frac{\partial H(u_k, K_k, SOC_k, \tilde{u}_k, \tilde{v}_k, x_k, p_{1,k+1}, p_{2,k+1}, p_{3,k+1}, p_{4,k+1})}{\partial \tilde{u}}$$

$$p_{3,k} = \frac{\partial H(u_k, K_k, SOC_k, \tilde{u}_k, \tilde{v}_k, x_k, p_{1,k+1}, p_{2,k+1}, p_{3,k+1}, p_{4,k+1})}{\partial \tilde{v}}$$

$$p_{3,k} = \frac{\partial H(u_k, K_k, SOC_k, \tilde{u}_k, \tilde{v}_k, x_k, p_{1,k+1}, p_{2,k+1}, p_{3,k+1}, p_{4,k+1})}{\partial x}$$

$$p_{2,N} = 0, p_{3,N} = 0, p_{4,N} = 4$$

$$SOC_{k+1} = SOC_k + \Delta t f(u_k, SOC_k)$$

$$\tilde{u}_{k+1} = \alpha \tilde{u}_k + (1-\alpha) u_k$$

$$\tilde{v}_{k+1} = K_k(x_{lead,k} - x_k)$$

$$x_{k+1} = x_k + \Delta t K_k(x_{lead,k} - x_k)$$

$$SOC_N = \underline{SOC}$$

Figure 8:
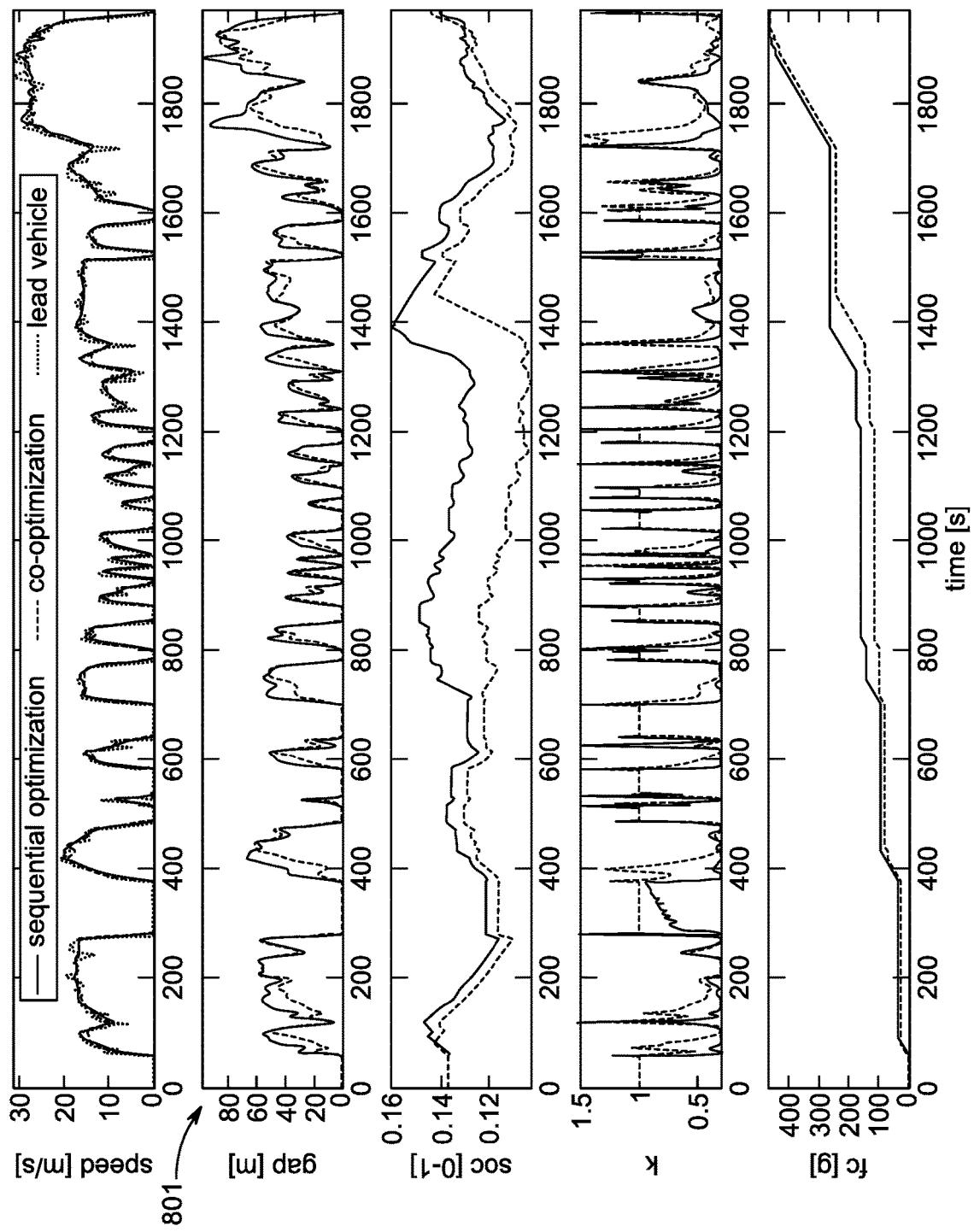
FIG. 8 are graphs illustrating a solution to an optimization control problem when power-split and car following are co-optimized in accordance with exemplary aspects of the disclosure.

FIG. 8 are graphs illustrating a solution to an optimization control problem when power-split and car following are co-optimized in accordance with exemplary aspects of the disclosure. The graphs include a graph of the gap 801 between a lead vehicle and a host vehicle. In some embodiments, total fuel consumption is further reduced by about 1.7% when car following is used along with power-split.

Figure 9:
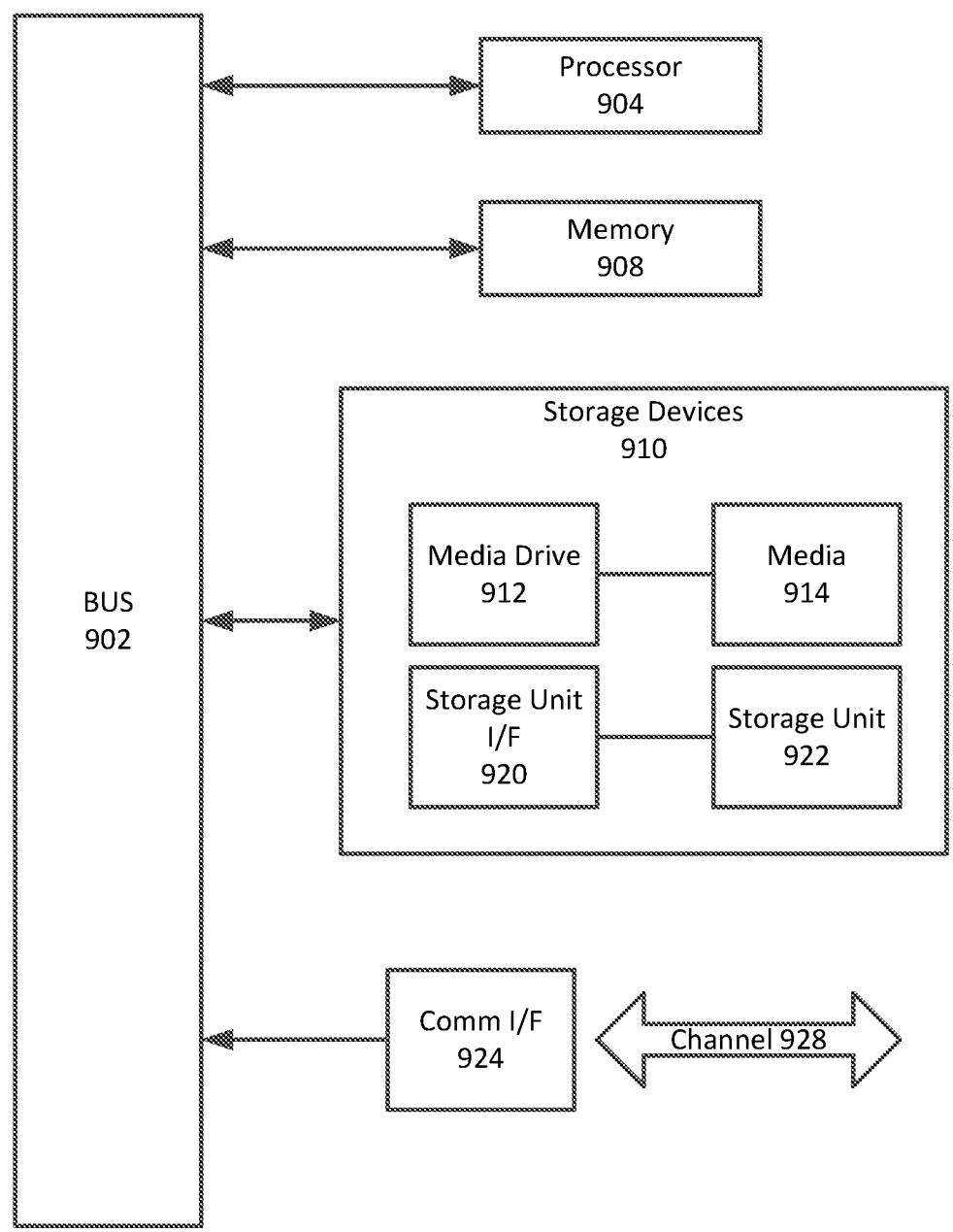
FIG. 9 is a block diagram of an exemplary computer system that may be used to implement various features of aspects of the disclosure.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within computer processing units or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, electronic devices that might include some form of processing capability.

Computing component 900 might include, for example, one or more processors, controllers, control components, or other processing devices. This can include a processor, and/or any one or more of the components making up electronic control device 50 and/or its component parts, hydraulic control circuit 40, or other components or elements of vehicle, e.g., signal sensors, etc. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid state drive, a magnetic tape drive, an optical drive, a compact disc (CD), digital video disc (DVD) drive, or Blu-ray drive (R or RW), or other removable or fixed media drive might be provided. Storage media 914 might include, for example, a hard disk, a solid state drive, an integrated circuit assembly, magnetic tape, cartridge, optical disk, a CD, DVD, or Blu-ray. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 908, storage unit 920, and media 914. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 900 to perform features or functions of the present application as discussed herein.

Numerous modifications and variations of the present invention are possible in light of the above teachings. It is therefore to be understood that within the scope of the appended claims, the invention may be practiced otherwise than as specifically described herein.

The invention claimed is:

1. A hybrid electric vehicle, comprising:
an internal combustion engine;
a battery;
an electric motor operatively coupled to the battery; and
an electronic control unit configured to:
estimate a vehicle velocity trajectory,
estimate an initial engine power trajectory,
simulate state of charge of the battery with the estimated vehicle velocity trajectory and the initial engine power trajectory, and store the state of charge and the estimated vehicle velocity trajectory,
estimate an initial terminal co-state value,
simulate backward co-state dynamics using the saved state of charge and the estimated vehicle velocity trajectory, and store a resulting co-state trajectory,
use the stored co-state trajectory to solve a minimization control and propagate state of charge dynamics forward in time, and update control and the co-state trajectory,
adjust the terminal co-state value to reduce a residual for a terminal condition, and
apply the updated control to control a usage of the battery and the internal combustion engine.

2. The hybrid electric vehicle of claim 1, wherein the solving the minimization control includes a cost of cranking the engine from an off state to an on state.

3. The hybrid electric vehicle of claim 1, wherein the solving the minimization control includes a filter to smooth an on-off transition of the engine.

4. The hybrid electric vehicle of claim 1, wherein a terminal state of charge of the battery is zero.

5. The hybrid electric vehicle of claim 2, wherein the cost of cranking includes a time required to crank the engine indicated as a time lag.

6. The hybrid electric vehicle of claim 1, wherein every predetermined time period, the state of charge of the battery is sampled and a single shot through the minimization control is performed including simulating co-state backward propagation, propagate state of charge dynamics forward in time, and adjust terminal co-state.

7. The hybrid electric vehicle of claim 1, wherein the cost of cranking the engine includes a cost of fuel in volume to turn on the engine.

8. The hybrid electric vehicle of claim 1, wherein the minimization control includes minimizing the fuel usage rate.

9. The hybrid electric vehicle of claim 1, wherein the vehicle is a self-driving vehicle,
wherein the vehicle includes a car following control, and
wherein the car following control includes a speed controller that controls vehicle speed based on the speed of a preceding vehicle.

10. The hybrid electric vehicle of claim 9, wherein the speed controller controls vehicle speed at a speed that maximizes fuel conservation.

11. A method of control of a hybrid electric vehicle, including an internal combustion engine, a battery, an electric motor operatively coupled to the battery, and an electronic control unit, the method, performed by the electronic control unit, comprising:
estimating a vehicle velocity trajectory;
estimating an initial engine power trajectory,
simulating state of charge of the battery with the estimated vehicle velocity trajectory, the initial engine power trajectory, and storing the state of charge and the estimated vehicle velocity trajectory;
estimating an initial terminal co-state value;
simulating backward co-state dynamics using the saved state of charge and the estimated vehicle velocity trajectory, and storing a resulting co-state trajectory;
using the stored co-state trajectory to solve a minimization control and propagate state of charge dynamics forward in time, and updating control and the co-state trajectory;
adjusting the terminal co-state value to reduce a residual for a terminal condition; and
applying the updated control to control a usage of the battery and the internal combustion engine.

12. The method of claim 11, wherein the solving the minimization control includes a cost of cranking the engine from an off state to an on state.

13. The method of claim 11, wherein the solving the minimization control includes a filter to smooth an on-off transition of the engine.

14. The method of claim 11, wherein a terminal state of charge of the battery is zero.

15. The method of claim 12, wherein the cost of cranking includes a time to crank the engine indicated as a time lag.

16. The method of claim 11, further comprising, every predetermined time period, sampling the state of charge of the battery and performing a single shot through the minimization control including simulating co-state backward propagation, propagating state of charge dynamics forward in time, and adjusting terminal co-state.

17. The method of claim 11, wherein the cost of cranking the engine includes a cost of fuel in volume to turn on the engine.

18. The method of claim 11, wherein the minimization control includes minimizing the fuel usage rate.

19. The method of claim 11, wherein the vehicle is a self-driving vehicle, and wherein the vehicle includes a car following control, wherein the car following control includes a speed controller, the method further comprising controlling vehicle speed, by the speed controller, based on the speed of a preceding vehicle.

20. The method of claim 19, wherein the controlling the vehicle speed includes controlling the vehicle speed at a speed that maximizes fuel conservation.

* * * * *